(12) United States Patent
Zhu et al.

(10) Patent No.: US 7,835,352 B2
(45) Date of Patent: Nov. 16, 2010

(54) METHOD, SYSTEM AND EQUIPMENT FOR PROCESSING SIP REQUESTS IN IMS NETWORK

(75) Inventors: Fenqin Zhu, Guangdong (CN); Yajuan Wu, Guangdong (CN)

(73) Assignee: Huawei Technologies Co., Ltd., Guangdong (CN)

( * ) Notice: Subject to any disclaimer, the term of this patent is extended or adjusted under 35 U.S.C. 154(b) by 533 days.

(21) Appl. No.: 11/506,581

(22) Filed: Aug. 18, 2006

(65) Prior Publication Data

US 2007/0121622 A1 May 31, 2007

(30) Foreign Application Priority Data

| Aug. 19, 2005 | (CN) | ......................... 2005 1 0090919 |
| Nov. 3, 2005 | (CN) | ......................... 2005 1 0119756 |

(51) Int. Cl.
H04L 12/28 (2006.01)
H04L 12/56 (2006.01)
(52) U.S. Cl. ...................................... 370/389; 370/401
(58) Field of Classification Search ................. 370/338, 370/230.1, 352, 401, 389; 455/401.1, 405; 709/230

See application file for complete search history.

(56) References Cited

U.S. PATENT DOCUMENTS

| 7,283,506 B2 * | 10/2007 | Mayer et al. ................ 370/338 |
| 2005/0050194 A1 * | 3/2005 | Honeisen et al. ............ 709/224 |
| 2005/0083909 A1 * | 4/2005 | Kuusinen et al. ............ 370/352 |
| 2005/0213606 A1 * | 9/2005 | Huang et al. ................ 370/467 |
| 2006/0092970 A1 * | 5/2006 | Song et al. .................. 370/466 |

| 2008/0043717 A1 | 2/2008 | Bellora et al. |

FOREIGN PATENT DOCUMENTS

| CN | 1300399 A | 6/2001 |
| CN | 1499804 | 5/2004 |
| CN | 1503524 A | 6/2004 |

(Continued)

OTHER PUBLICATIONS

3GPP, "3rd Generation Partnership Project; Technical Specification Group Core Network; IP Multimedia (IM) Session Handling; IM Call Model; State 2 (Release 6)," 3GPP TS 23.218 v6.3.0 (2005).

(Continued)

*Primary Examiner*—Chirag G Shah
*Assistant Examiner*—Minh-Trang Nguyen

(57) ABSTRACT

A method for processing SIP requests in an IMS network includes: an AS in the IMS network receiving a first SIP request forwarded by a S-CSCF entity, generating a second SIP request and deciding whether it is needed to associate the second SIP request with the first SIP request in terms of service logic at the S-CSCF entity, if it is needed to associate two requests, removing the URI of the AS from the Route header of the first SIP request; otherwise, regenerating the Route header of the second SIP request in the originating UA behavior mode and sending the second SIP request to the S-CSCF entity. Also disclosed is a system for processing SIP requests in an IMS network, including an AS and a S-CSCF entity. Also disclosed is an AS for processing SIP requests in an IMS network and a network entity for service control.

12 Claims, 5 Drawing Sheets

FOREIGN PATENT DOCUMENTS

| | | |
|---|---|---|
| CN | 1655546 | 8/2005 |
| CN | 1747470 A | 3/2006 |
| WO | WO 2005/029809 A1 | 3/2005 |
| WO | WO 2005/055549 | 6/2005 |

OTHER PUBLICATIONS

3GPP, "3$^{rd}$ Generation Partnership Project; Technical Specification Group Core Network and Terminals; IP Multimedia Call Control Protocol Based on Session Initiation Protocol (SIP) and Session Description Protocol (SDP); Stage 3 (Release 6)," 3GPP TS 24.229 v6.7.0 (2005).

European Search Report for Application No. EP 06 25 4341, dated Jan. 4, 2007.

International Search Report for International Application No. PCT/CN2006/001851, dated Nov. 30, 2006.

Written Opinion of the International Searching Authority dated Nov. 30, 2006 in connection with International Patent Application No. PCT/CN2006/001851.

Communication pursuant to Article 94(3) EPC dated Apr. 28, 2009 in connection with European Patent Application No. 06 254 341.8.

Partial Translation of Office Action dated Feb. 5, 2010 in connection with Chinese Patent Application No. 200680011706.1.

* cited by examiner

METHOD, SYSTEM AND EQUIPMENT FOR PROCESSING SIP REQUESTS IN IMS NETWORK

CROSS-REFERENCES TO RELATED APPLICATIONS

This application claims the benefit of Chinese Patent Application No. 200510090919.5, which was filed on Aug. 19, 2005, and Chinese Patent Application No. 200510119756.9, which was filed on Nov. 3, 2005, the entire disclosures of which are hereby incorporated herein by reference.

BACKGROUND OF THE INVENTION

1. Field of the Technology

The present invention relates to IP Multimedia Subsystem (IMS) network in the communication field, more particularly to a method, system and equipment for processing Session Initiation Protocol (SIP) requests in IMS network when an Application Server (AS) is taken as a Back-to-Back User Agent (B2BUA).

2. Background of the Invention

In an IMS network, the Serving Call Session Control Function (S-CSCF) entities generally do not execute specific service and the service logic is placed in the AS. Upon receiving a SIP request, the S-CSCF searches the User Profile (UP) downloaded during the registration of the user for the initial Filter Criteria (iFC) matching with the SIP request and forwards the SIP request to the relevant AS based on the rule of iFC. The AS can serve different roles for IMS dialogs. If the AS serves as the dialog originator, as shown in FIG. 1A, the AS originates a dialog and sends this dialog to the S-CSCF, and the S-CSCF will not change relevant information of this dialog. If the AS serves as the B2BUA, as shown in FIG. 1B, the AS receives the SIP request sent by the S-CSCF, it ends that dialog and initiates a new dialog, and the association between the two dialogs is performed by the AS, but from the aspect of S-CSCF, since the two dialogs are different, the relevant information, such as Call-ID and from/to tag, of one dialog is different from that of the other.

In the mode when the AS serves as the B2BUA, however, the S-CSCF often needs to know the association between the two dialogs since the user may still hope to adopt the iFC of the original dialog for the new dialog. Because the two dialogs are different, the two dialogs must be associated by using other identifiers in the SIP requests, like Orig-DIALOG ID in Route header, rather than directly using SIP dialog identifiers like Call-ID.

Several headers of the SIP request closely related to the present invention will be briefly described hereinafter:

Route header: indicating the next routing entity, i.e., the next hop of the SIP request, and may include the Orig-DIALOG ID which is used to assist the S-CSCF in learning the corresponding relation between the new dialog and the original dialog;

P-Asserted-Identity header: a user identifier inserted by a network entity and identifying the originator that originates the request;

Request-URI header: indicating the request's final destination.

When the AS acts as the B2BUA, the AS decides whether the new and original dialog need be associated based on the specific service logic. Moreover, the AS can also modify the Request-URI header or P-Asserted-Identity header included in the SIP request based on the specific service logic.

According to the existing protocol specification, when the S-CSCF is sending a SIP request to the AS, the S-CSCF must place the Uniform Resource Identifier (URI) of the S-CSCF that includes an Orig-DIALOG ID in the Route header, behind the AS URI. In this way, upon receiving the SIP request, the AS removes the topmost part of Route header i.e., AS URI, therefore S-CSCF URI is the topmost part of the Route header. The AS transmits the SIP request based on the Route header information, such that the SIP request will be transmitted to the S-CSCF. Upon receiving the SIP request, the S-CSCF decides whether the SIP request is initiated by the AS or has been processed by the S-CSCF before transmitted by judging whether the Route header includes an Orig-DIALOG ID, and if it is determined that the SIP request is processed by the S-CSCF before, the S-CSCF determines the original dialog to which the current dialog is associated according to the Orig-DIALOG ID carried in the Route header of the SIP request and further performs the incomplete iFC process to the current dialog.

The specific process of associating the new dialog and original dialog can be described in detail by describing the operations of the S-CSCF and those of the AS respectively.

Operations of the S-CSCF:

1. Upon receiving a SIP request, if the S-CSCF finds that this request includes an Orig-DIALOG ID, the S-CSCF determines that this request has been processed by the S-CSCF before. According to the Orig-DIALOG ID, the S-CSCF finds the original dialog and, when confirming that the related user identifier is unmodified, say on the calling side the P-Asserted-Identity has not been modified or on the called side the Request-URI has not been modified, continues to execute the incomplete iFC process.

2. Upon receiving the SIP request, if the S-CSCF finds that this request includes no Orig-DIALOG ID, the S-CSCF determines that this request corresponds to a new dialog originated by the AS. The S-CSCF decides how to process the request according to the iFC matching with this request. If the S-CSCF needs to forward this request to the AS, the S-CSCF fills the AS URI and the S-CSCF URI in the Route header in sequence, and the S-CSCF URI includes an ORIG-DIALOG ID. An example is as follows:

ROUTE <AS-URI; >; <Orig-DIALGO ID@S-CSCF1;>.

Therein, the Orig-DIALOG ID can also be indicated by other identification such as specific port.

Operations of the AS:

1. Upon receiving the SIP request and executing relevant operations, the AS determines its own role during this dialog according to the service logic and determines how to generate new SIP requests. If the AS serves as the B2BUA, the AS should remove its own AS URI from the Route header of the original SIP request, copy the rest of the Route header to the new request as the Route header of the new request and route this new request according to the Route header. Therefore, a URI in the new request, which corresponds to the S-CSCF and includes the Orig-DILOG ID, will be placed at the top of the Route header.

Therefore, the AS URI is removed from the Route header in the new request by the AS, so the S-CSCF will receive a request that includes the following Route header:

Route <Orig-DIALOG ID@S-CSCF1;>□ . . .

In this way, upon receiving the SIP request returned from the AS, the S-CSCF can determine the original dialog to which the received SIP request associates according to the Orig-DIALOG ID and execute subsequent iFC process after confirming that the relevant user identifier is unmodified.

SUMMARY OF THE INVENTION

A method for processing Session Initiation Protocol (SIP) requests in an IP Multimedia Subsystem (IMS) network includes the following steps: an Application Server (AS) in the IMS network receiving a first SIP request forwarded by a Serving Call Session Control Function (S-CSCF) entity and generating a second SIP request according to the first SIP request; the AS deciding whether it is needed to associate the second SIP request with the first SIP request in the S-CSCF, if it is needed to associate the two requests, removing the Uniform Resource Identifier (URI) of the AS from the Route header of the first SIP request and taking the rest of the Route header as the Route header of the second SIP request; otherwise, the AS constructing the Route header of the second SIP request in the originating User Agent (UA) behavior mode; the AS sending the second SIP request to the S-CSCF entity.

A method for processing SIP requests in an IMS network includes the following steps: an Application Server (AS) in the IMS network receiving a first SIP request forwarded by a Serving Call Session Control Function (S-CSCF) entity and generating a second SIP request according to the first SIP request; if the AS act as B2BUA role in this process, the AS deciding whether it is needed to associate the second SIP request with the first SIP request in the S-CSCF, if it is needed to associate the two requests, removing the Uniform Resource Identifier (URI) of the AS from the Route header of the first SIP request and taking the rest of the Route header as the Route header of the second SIP request; if there is no need to associate the two requests, the AS constructing the Route header of the second SIP request in the originating UA behavior mode; the AS sending the second SIP request to the S-CSCF entity; upon receiving the second SIP request, the S-CSCF deciding whether the second SIP request carries an associated dialog identifier, if the second SIP request does not carry the identifier, the S-CSCF processing the second SIP request in a manner of processing a new dialog; if the second SIP request carries the identifier, the S-CSCF finding the first dialog that is associated with the second SIP request according to the associated dialog identifier and deciding whether user related information of the first SIP request is the same as that of the second SIP request, if the user related information of the two requests are the same, the S-CSCF performing subsequent processing upon the second SIP request according to the fact that the first SIP request and the second SIP request are associated in terms of service logic; if the user related information of the two requests are different, the S-CSCF performing subsequent processing upon the second SIP request according to the fact that the first SIP request and the second SIP request are unassociated in terms of service logic.

A system for processing SIP requests in an IMS network includes: an Application Server (AS), receiving a first SIP request forwarded by a Serving Call Session Control Function (S-CSCF) entity, generating a second SIP request, generating the Route header of the second SIP request by deciding whether it is needed to associate the second SIP request with the first SIP request at the S-CSCF, and then sending the second SIP request to the S-CSCF entity; the S-CSCF entity, sending the first SIP request to the AS, receiving and processing the second SIP request from the AS.

An Application Server (AS) in an IMS network includes a first service logic processing unit, processing a first request forwarded by a Serving Call Session Control Function (S-CSCF) entity; a second service logic processing unit, generating a second SIP request and generating the Route header of the second SIP request by deciding whether it is needed to associate the first SIP dialog and the second SIP dialog in terms of service logic.

An IMS network includes a first processing unit, deciding whether a received second SIP request includes an associated dialog identifier, and if the second SIP request includes the identifier, finding a first SIP request that matches the second SIP request; a second processing unit, deciding whether user related information of the first SIP request is the same as that of the second SIP request and outputting the decision to a third processing unit; the third processing unit, processing the second SIP request according to the decision and in a manner of the two requests being or not being associated.

It can be seen from the technical scheme that beneficial effects of the present invention are as follows.

When the AS generates the second SIP request upon receiving the first SIP request, the AS generates the second SIP request's Route header by deciding whether the second SIP request and the first SIP request need to be associated according to the service logic, and if these two requests need not be associated, the AS regenerates the second SIP request's Route header. In the prior art, however, part of the first SIP request's Route header is copied as the second SIP request's Route header no matter whether the two requests need to be associated. as can be seen from the above comparison, the present invention mainly aims at the situation that the new dialog and old dialog need not be associated at the S-CSCF, which is not considered in the prior art, for instance, the new dialog and old dialog may correspond to different users and the Route header content of the new dialog should be different from that of the old dialog, thereby preventing the detection and process of the S-CSCF from confusion.

Furthermore, the present invention adopts a wildcard matching rule to compare various URI, thereby avoiding the possible problem of being unable to correctly proceed service logic due to the fact that the wildcard character is not taken into account in the prior art.

DETAILED DESCRIPTION OF THE PREFERRED EMBODIMENTS

The present invention will be illustrated in detail hereinafter with reference to the accompanying drawings and specific embodiment.

In the IMS network, the two key headers related closely to the service logic process are P-Asserted-Identity header and Request-URI header. When an AS serves as a B2BUA, if there is no association between the first SIP request sent from an S-CSCF to the AS and the second SIP request generated by the AS in terms of service logic, the AS may modify the two headers in the second SIP request. To make the S-CSCF correctly detect and process the second SIP request forwarded by the AS, the AS generates a Route header of the second SIP request through deciding whether the new SIP request and the old SIP requests are associated in terms of service logic.

It should be noted that the "first" and "second" used here are only for distinguishing the two requests and not for defining the actual sequence of the two requests.

Figure 1A:
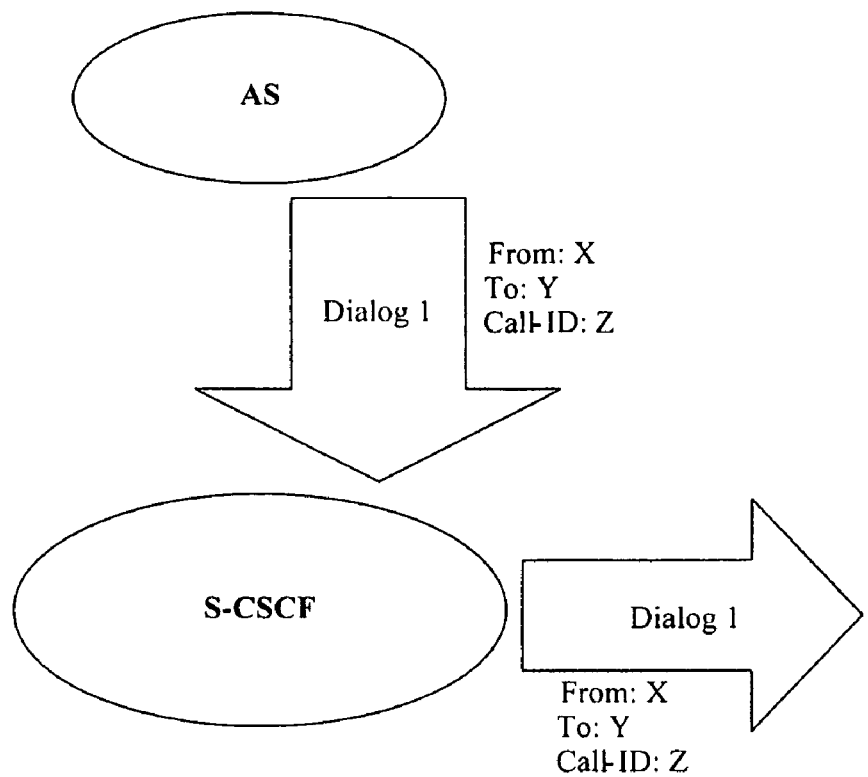
FIG. 1A is a schematic diagram of an AS serving as an originator in the prior art.
Figure 1B:
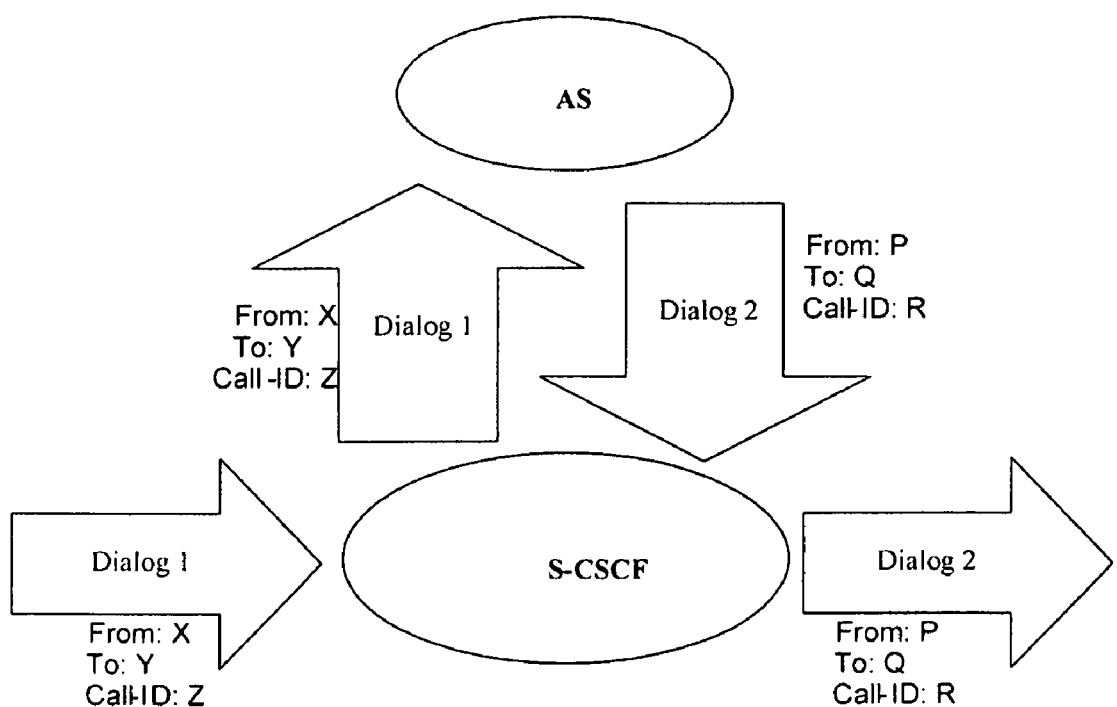
FIG. 1B is a schematic diagram of an AS serving as a B2BUA in the prior art.
Figure 2:
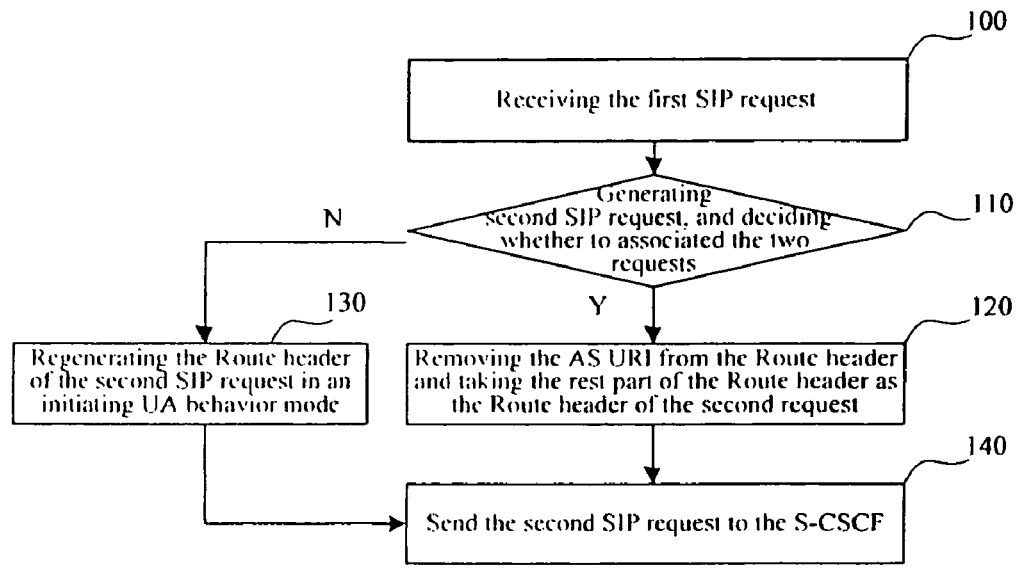
FIG. 2 is a flowchart of the request process when an AS serves as a B2BUA in accordance with an embodiment of the present invention.

FIG. 2 shows the main procedure of the request process when the AS serves as the B2BUA. It should be understood that the following process does not include all steps of request process when the AS serves as the B2BUA. As shown in FIG. 2, the main procedure of request process when the AS serves as the B2BUA includes the following steps:

Step 100: The AS receives the first SIP request forwarded by the S-CSCF entity and processes this SIP request according to the service logic.

Step 110: The AS generates the second SIP request according to the service logic and, during the procedure of generating the second SIP request, decides whether the first SIP request and the second SIP request need to be associated in terms of the service logic at the S-CSCF, and if yes, proceeds to step 120; otherwise, proceeds to step 130.

Step 120: The AS deletes the AS URI from the first SIP request's Route header and copies the rest of the Route header to the second SIP request as the Route header of the second SIP request, and then proceeds to step 140.

Step 130: The AS regenerates the second SIP request's Route header in an originating UA behavior mode.

Step 140: The AS sends the second SIP request to the S-CSCF entity.

As to a dialog, the AS may process a request from the calling, i.e., the AS is on the calling side, and the AS may process a request from the called, i.e., the AS is on the called side. The AS can decide whether the IP Multimedia PUblic identity (IMPU) processed by the AS is the calling or the called according to the subscription data of iFC, therefore, the AS can decide whether it is on the calling side or called side upon receiving the SIP request forwarded by the S-CSCF. For instance, the AS marks an ORIG-AS in the subscribed iFC record, and when the S-CSCF needs to route a SIP request containing the ORIG-AS to the AS according to the iFC process, the AS knows that it is on the calling side and needs to process on behalf of the user as the P-Asserted-Identity indicated. Otherwise, if the AS receives a SIP request without the ORIG-AS, the AS knows that it is on the called side and needs to process on behalf of the user as Request-URI indicated. Obviously, the present invention is not constrained by the above description, and the special identification or special port in an AS URI can also be adopted to decide whether the AS process is on the calling side or called side.

There are two methods for deciding whether the first and second SIP requests are associated in terms of the service logic:

The first method: the AS decides whether to modify the P-Asserted-Identity header or Request-URI header according to the executed service logic. When the service logic is designed, it is already taken into account that some types of service logic need modify the header while other types of service logic need not. If the AS finds out that the executed service logic will modify the header, the AS determines that the fist SIP request and the second SIP request are unassociated; if the AS finds out that the executed service logic will not modify the header, the AS determines that the fist SIP request and the second SIP request are associated.

It can be seen that the AS can decide whether the fist SIP request and the second SIP request are associated while selecting the service, and process the dialog according to the decision, namely whether the former service and the latter service need to be associated is defined by the designer of the service logic.

The second method: the AS decides whether the first SIP request and the second SIP request need to be associated at the S-CSCF according to the execution result of the service logic that is used for processing the SIP request.

The subsequent processing of the above two methods, which are used to determine whether the former service and the latter service need to be associated, are basically the same to each other, therefore, the process will be illustrated hereinafter by taking the second method as the example.

For instance, during the procedure of generating the second SIP request, the service logic generates user related information for the second SIP request, and the AS can decide whether the second SIP request and the first SIP request need to be associated at the S-CSCF, according to the user related information generated for the second SIP request and user related information of the first SIP request, and generate the Route header of the second SIP request according to the decision. During the deciding process, if the AS is on the calling side, the decision is performed mainly according to the first SIP request's P-Asserted-Identity header and the second SIP request's P-Asserted-Identity header; if the AS is on the called side, the decision is performed mainly according to the first SIP request's Request-URI header and the second SIP request's Request-URI header. During the deciding process, the wildcard matching rule can be also used for comparison. The application of wildcard character in the IMS network will be illustrated before introducing the specific process.

In traditional telecommunication networks, there is a type of special telephone numbers, like 114/100. These special telephone numbers generally do not represent actual users, so there is no such process as user registration or authentication accordingly. The IMS network also introduces a similar special identity that is called Public Service Identity (PSI). Two types of PSI are introduced in the IMS network, which is different from traditional special identity. One type is called the specific PSI that represents special users, and the other type is called wildcard PSI that represents a certain type of users rather than special users.

The wildcard PSI can represent multiple different specific PSIs, and when the format of the wildcard PSI adopts the format of SIP URI, the USER-INFO can include the extensive canonical expression format that is constrained by "!" and defined by IEEE 1003.1-2004 Part 1. For example, "sip:chatlist!.*!@example.com" can be matched to:

sip:chatlist1@example.com,
sip:chatlist2@example.com, sip:chatlist42@example.com,
sip:chatlistAbC@example.com.

When the format of TEL URI is adopted, the user telephone part can include the extensive canonical expression format that is constrained by "!" and defined by IEEE 1003.1-2004 Part 1. For example, "TEl:1234560☐.*!" can be matched to:

EL☐1234561;
TEL☐1234567;
TEL☐123456789.

Figure 3A:
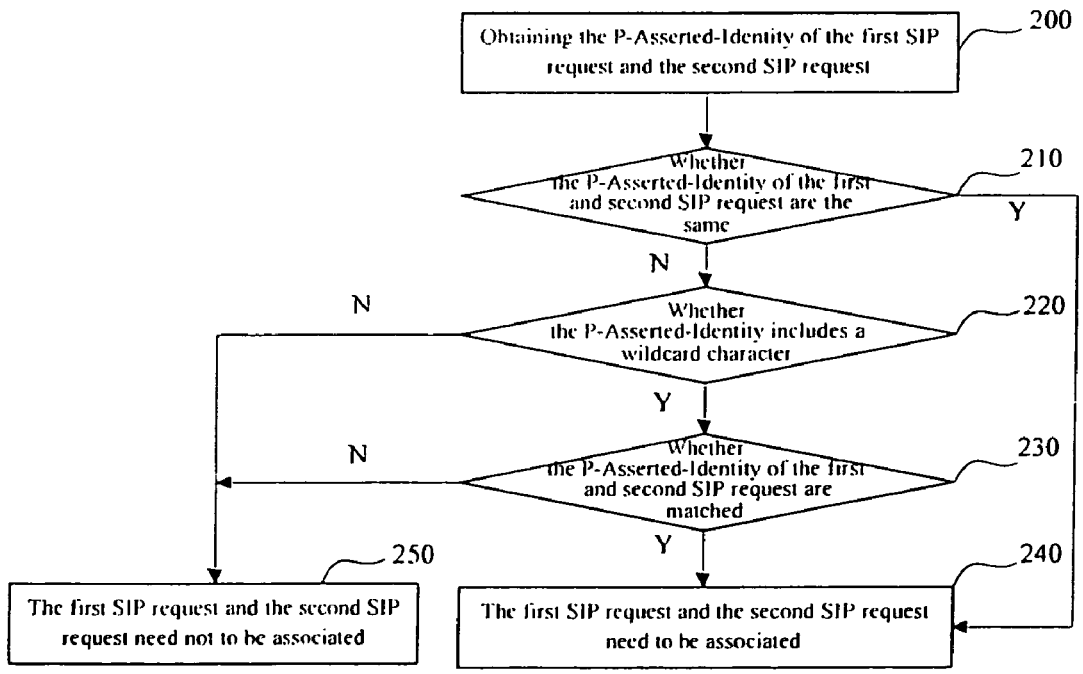
FIG. 3A is a flowchart of determining service logic association when an AS is on the calling side in accordance with an embodiment of the present invention.

With reference to FIG. 3A, when the AS is on the calling side, main procedure of deciding whether the first SIP request and the second SIP request are associated in terms of the service logic includes the following steps:

Step 200: Obtaining the P-Asserted-Identity of the first SIP request and that of the second SIP request.

Step 210: Deciding whether the P-Asserted-Identity of the first SIP request and that of the second SIP request are identical, if the two are identical, proceed to step 240; otherwise, proceed to step 220.

Step 220: Deciding whether the P-Asserted-Identity includes any wildcard character, if yes, proceed to step 230; otherwise, proceed to step 250.

Step 230: Deciding whether the P-Asserted-Identity of the first SIP request and that of the second SIP request match with each other according to the predefined wildcard matching rule, if yes, proceed to step 240; otherwise, proceed to step 250.

Step 240: The AS determines that the first SIP request and the second SIP request are associated in terms of the service logic.

Step 250: The AS determines that the first SIP request and the second SIP request are unassociated in terms of the service logic.

According to the requirement of the service logic process, the basis of deciding performed by the AS may also be the combination of P-Asserted-Identity and Request-URI of the first SIP request and that of the second SIP request. In other words, after determining that the P-Asserted-Identity of the first SIP request and that of the second SIP request are identical, the AS can further decide whether the Request-URI of the first SIP request and that of the second SIP request are identical. If the P-Asserted-Identities of the two requests are identical while the Request-URIs of the two requests are not, it can be determined that the first SIP request and the second SIP request need not be associated in terms of the service logic.

It should be understood that, when comparing the P-Asserted-Identity of the first SIP request and that of the second SIP request, it is feasible to disregard the wildcard character and only decide whether the P-Asserted-Identities of the two requests are identical, if yes, it is determined that the two requests are associated; otherwise, the two requests are unassociated. The introduction of wildcard match is used for further optimizing the basic scheme of the present invention.

Figure 3B:
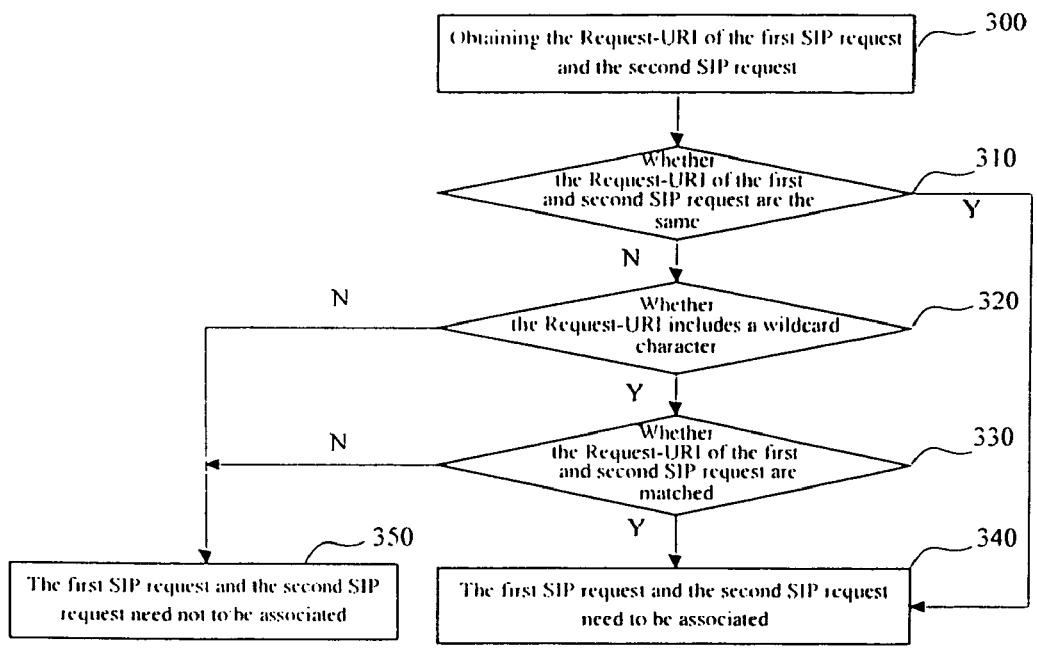
FIG. 3B is a flowchart of determining service logic association when an AS is on the called side in accordance with an embodiment of the present invention.

With reference to FIG. 3B, when the AS is on the called side, main procedure of deciding whether the first SIP request and the second SIP request are associated in terms of the service logic includes the following steps:

Step 300: Obtaining the Request-URI of the first SIP request and that of the second SIP request.

Step 310: Deciding whether the Request-URI of the first SIP request and that of the second SIP request are identical, if the two are identical, proceed to step 340; otherwise, proceed to step 320.

Step 320: Deciding whether the Request-URI includes any wildcard character, if yes, proceed to step 330; otherwise, proceed to step 350.

Step 330: Deciding whether the Request-URI of the first SIP request and that of the second SIP request match with each other according to the predefined wildcard matching rule, if yes, proceed to step 340; otherwise, proceed to step 350.

Step 340: The AS determines that the first SIP request and the second SIP request are associated in terms of the service logic.

Step 350: The AS determines that the first SIP request and the second SIP request are unassociated in terms of the service logic.

In a same way, after determining that the Request-URI of the two requests are identical, the AS may further decide whether the P-Asserted-Identity of the first SIP request and that of the second SIP request are identical.

The AS can also add information to the second SIP request or modify information of the second SIP request, like modifying the Request-URI or P-Asserted-Identity to prompt the S-CSCF to continue the subsequent iFC process or not.

It should be understood that, during the procedure of comparing the Request-URI of the first SIP request and that of the second SIP request, it is feasible to disregard the wildcard character and only decide whether the Request-URIs of the two requests are identical, if the two Request-URIs are different, it is determined that the two request are associated; otherwise, it is determined that the two requests are unassociated. The introduction of wildcard match is used for further optimizing the scheme of the present invention.

As to the S-CSCF, upon receiving the second SIP request transmitted by AS, if the S-CSCF detects that the received request carries an Orig-DIALOG ID, the S-CSCF will search for the first SIP request (the old dialog) matching with this request according to the Orig-DIALOG ID directly. Then, the S-CSCF performs the process according to the information of whether to continue the subsequent iFC process carried by the second SIP request. If the S-CSCF does not detect any Orig-DIALOG ID in the second SIP request, this request will be taken as a new SIP request and be processed directly according to the existing method of the standard.

Upon receiving the second SIP request generated by the AS according to the above-mentioned method, the S-CSCF entity can directly perform subsequent iFC detection and process upon the second SIP request according to the Route header of the SIP request, since the first SIP request's Route header will not be copied as the second SIP request's Route header until the AS has determined that the first SIP request and the second SIP request need to be associated. However, in order to make the S-CSCF compatible with those ASs having no the above-mentioned processing ability, after finding out the first SIP request matching with the second SIP request according to the Orig-DIALOG ID, the S-CSCF can further determine whether to continue the subsequent iFC process by deciding whether the information added or modified by the AS, like P-Asserted-Identity or Request-URI, in the first SIP request and that in the second SIP request are identical according to SIP URI or TEL-URL matching rule. It should be understood that, while comparing the P-Asserted-Identity or Request-URI in the first SIP request and the second SIP request, it is feasible to disregard the wildcard character and only decide whether the P-Asserted-Identities or Request-URIs of the two requests are identical, if the two Request-URIs are different, it is determined that the two requests are associated; otherwise, it is determined that the two requests are unassociated. The introduction of wildcard match is used for further optimizing the scheme of the present invention.

Upon receiving the SIP request, the S-CSCF decides whether it is the first time this SIP request arrives at this S-CSCF by deciding whether this request includes an ORIG-DIALOG ID. As to the first SIP request, the S-CSCF can decide whether it is processing the SIP request on the calling side or the SIP request on the called side according to the information of the first SIP request. As to a SIP request which does not arrive at the S-CSCF the first time, the S-CSCF finds out if the first SIP request matching with the SIP request firstly and then decides whether this SIP request is the SIP request on the calling side or that on the called side. If determining that the request is a SIP request on the calling side, the S-CSCF will decide whether to perform iFC detection and process upon the second SIP request forwarded by the AS mainly by deciding whether the P-Asserted-Identity of the first SIP request and that of the second SIP request are identical; if determining that the request is a SIP request on the called side, the S-CSCF will decide whether to perform iFC detection and process upon the second SIP request forwarded by the AS mainly by deciding whether the Request-URI of the first SIP request and that of the second SIP request are identical. During the procedure of comparing the P-Asserted-Identity and Request-URI of the fist SIP request and that of the second SIP request, the wildcard character can be taken into account.

Figure 4:
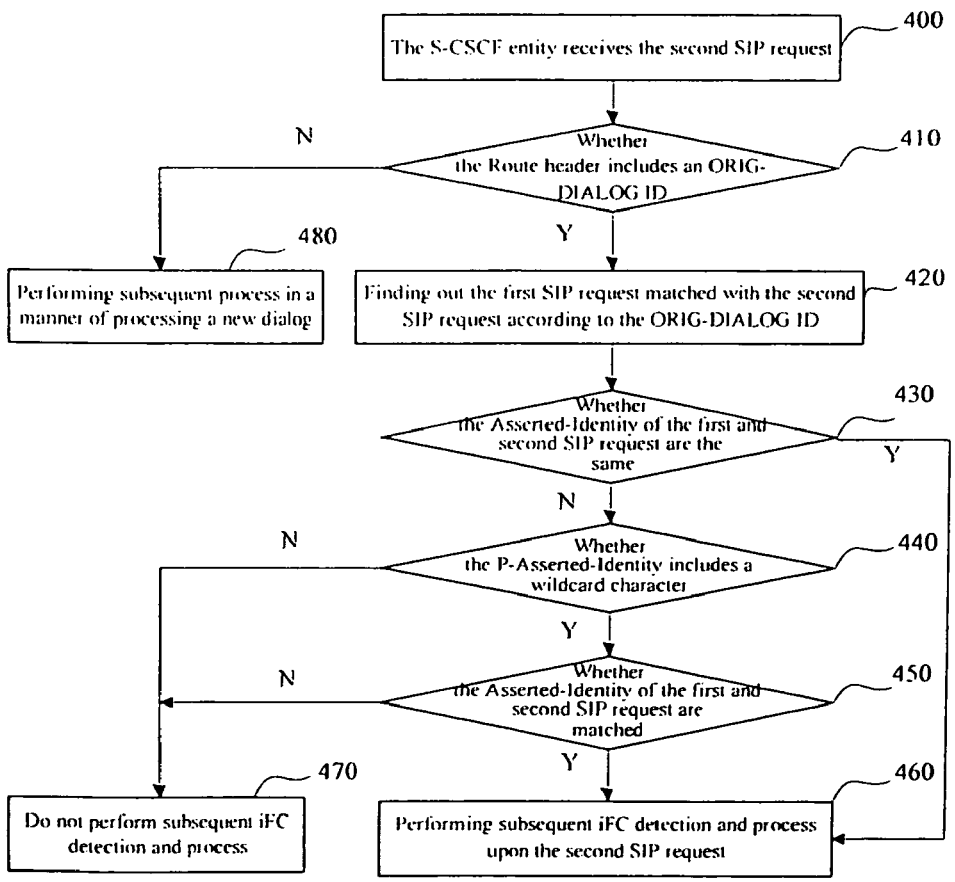
FIG. 4 is a flowchart of a S-CSCF processing the B2BUA request in accordance with an embodiment of the present invention.

With reference to FIG. 4, when the S-CSCF is on the calling side, the main procedure of processing the second SIP request forwarded by the AS includes the following steps:

Step 400: The S-CSCF entity receives the second SIP request.

Step 410: The S-CSCF decides whether the Route header includes an ORIG-DIALOG ID, if yes, proceed to step 420; otherwise, proceed to step 480.

Step 420: The S-CSCF finds out the first SIP request that matches with the second SIP request according to the Orig-DIALOG ID.

Step 430: The S-CSCF decides whether the P-Asserted-Identity of the first SIP request and that of the second SIP request are identical, if yes, proceed to step 460; otherwise, proceed to step 440.

Step 440: The S-CSCF decides whether the P-Asserted-Identity includes any wildcard character, if yes, proceed to step 450; otherwise, proceed to step 470.

Step 450: The S-CSCF decides whether the P-Asserted-Identity of the first SIP request and that of the second SIP request match with each other, if yes, proceed to step 460; otherwise, proceed to step 470.

Step 460: The S-CSCF determines that the first SIP request and the second SIP request are associated in terms of the service logic and performs subsequent iFC detection and process upon the second SIP request.

Step 470: The S-CSCF determines that the first SIP request and the second SIP request are not associated in terms of the service logic and, rather than performing subsequent iFC detection and process upon the second SIP request, determines the next hop according to the Route header and Request-URI header of the second SIP request and then forwards the second SIP request to the next hop.

Step 480: The S-CSCF processes the second SIP request in the manner of processing a new dialog.

When the S-CSCF entity is on the called side and processes the second SIP request forwarded by the AS, the processes are basically the same as the processes when the S-CSCF entity is on the calling side except the procedure of deciding whether the first SIP request's Request-URI and the second SIP request's Request-URI are identical when the S-CSCF is on the calling side, which are not to be described in detail hereinafter.

It should be understood that, during the procedure of comparing the P-Asserted-Identities of the two requests, it is feasible to disregard the wildcard character and only decide whether the P-Asserted-Identities of the two requests are identical, if yes, it is determined that the two requests are associated; otherwise, it is determined that the two requests are unassociated. The introduction of wildcard match is used for optimizing the scheme of the present invention.

Figure 5:
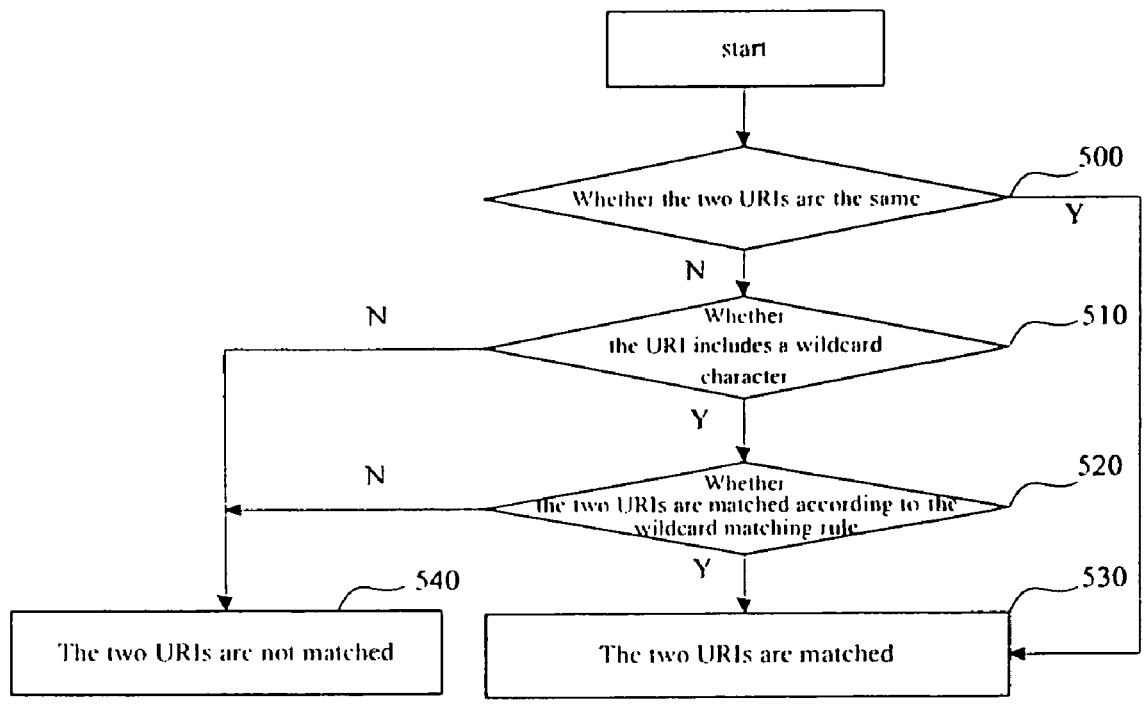
FIG. 5 is a flowchart of matching two URIs in an IMS network in accordance with an embodiment of the present invention.

With reference to the description of FIG. 3A, FIG. 3B and FIG. 4, it can be seen that the method for matching URIs in accordance with an embodiment of the present invention can be applied to any scene of IMS network to compare URIs. As shown in FIG. 5, the main procedure of matching URIs includes the following steps:

Step 500: Deciding whether the two URIs are identical, if yes, proceed to step 530; otherwise, proceed to step 510.

Step 510: Further deciding whether at least one of the URIs includes any wildcard character, if not, proceed to step 540; otherwise, proceed to step 520.

Step 520: Deciding whether the two URIs match with each other according to the predefined wildcard matching rule, if yes, proceed to step 530; otherwise, proceed to step 540.

Step 530: Determining that the two URIs match with each other and continuing the subsequent processing according to the matching status.

Step 540: Determining that the two URIs do not match with each other and continuing the subsequent processing according to the un-matching status.

Figure 6:
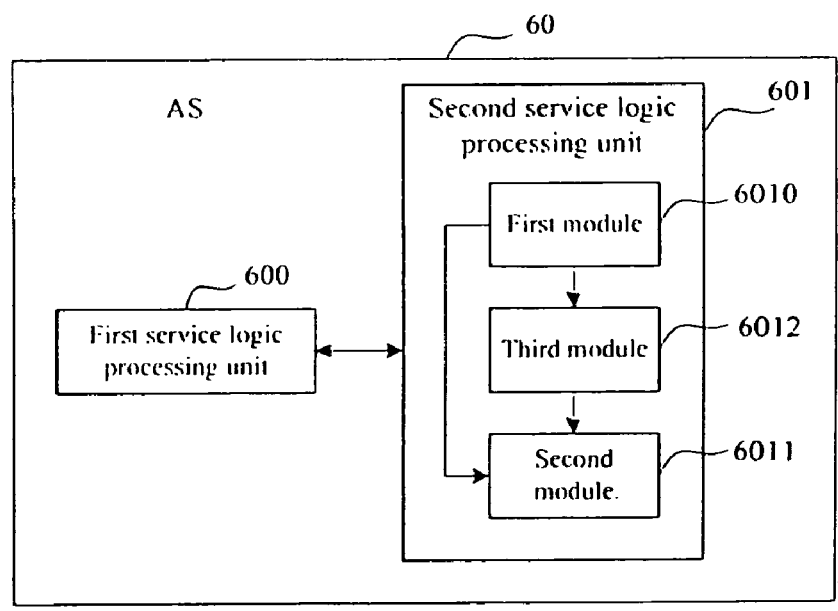
FIG. 6 is a schematic diagram of the structure of an AS in accordance with an embodiment of the present invention.

With reference to FIG. 6, the AS 60 in an embodiment for implementing the above-described method includes the first service logic processing unit 600 and the second service logic processing unit 601. It should be noted that other function modules for implementing existing basic functions are not shown in FIG. 6.

The first service logic processing unit 600 is used for processing the first SIP request forwarded by the S-CSCF.

The second service logic processing unit 601 is logically connected to the first service logic processing unit 600, and used for generating the second SIP request and, while generating the second SIP request, generating the Route header for the second SIP request according to the decision whether it is needed to associate the first SIP request with the second SIP request in terms of the service logic. Specifically, if it is needed to associate the two SIP requests, the AS URI will be removed from the Route header of the first SIP request and the rest of the Route header will be taken as the Route header of the second SIP request; otherwise, the Route header of the second SIP request will be constructed in an originating UA behavior mode.

The second service logic processing unit 601 includes the first module 6010, the second module 6011 and the third module 6012.

The first module 6010 is used for deciding whether relevant information of the first SIP request and that of the second SIP request are identical or determining whether it is needed to associate the first SIP request with the second SIP request at the S-CSCF entity according to the selected service logic; if the relevant information of the two requests are identical or it is needed to associate the two requests, outputting the decision to the second module 6011; otherwise, outputting the decision to the third module 6012. The relevant information may be user related information including P-Asserted-Identity header and/or Request-URI header.

The third module 6012 is logically connected to the first module 6010; when the relevant information of the first request and that of the second request are different and when each of the two requests includes no wildcard character, the third module 6012 is used for deciding whether the relevant information of the first SIP request and that of the second SIP request match with each other and outputting the decision to the second module 6011.

The second module 6011 is logically connected to both the first module 6010 and the third module 6012 and is used for generating the Route header according to the decision of the first module 6010 and that of the third module 6012.

It should be noted that the third module 6012 is optional and may be excluded. In other words, the process of deciding whether relevant information of the first SIP request and that of the second SIP request match according to the wildcard matching rule can be excluded. In this case, the first module 6010 directly outputs the decision to the second module 6011.

Figure 7:
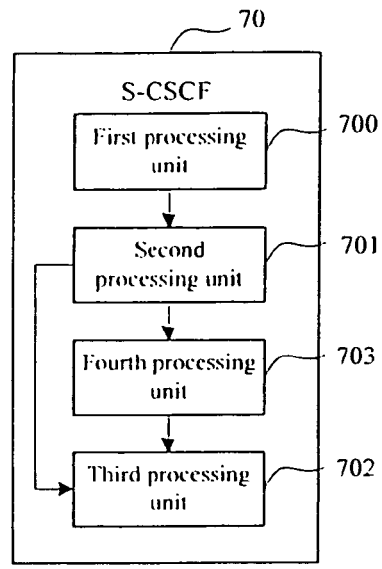
FIG. 7 is a schematic diagram of the structure of a S-CSCF in accordance with an embodiment of the present invention.

With reference to FIG. 7, the S-CSCF entity 70 in an embodiment of the present invention for implementing the above-mentioned method includes the first processing unit 700, the second processing unit 701, the third processing unit 702 and the fourth processing unit 704, while other function modules for implementing the existing basic functions are not shown in FIG. 7.

The first processing unit 700 decides whether the received second SIP request includes the related associated dialog identifier and, when it is determined that the second SIP request includes the associated dialog identifier, determines the first SIP request that is matched with the second SIP request.

The second processing unit 701 is logically connected to the first processing unit 700 and is used for deciding whether the relevant information of the first SIP request and that of the second SIP request are identical, if yes, outputting the decision to the third processing unit 702; otherwise, outputting the decision to the fourth processing unit 703.

The fourth processing unit 703 is logically connected to the second processing unit 701; when the relevant information of the first request and that of the second request are different and each of the two requests does not include wildcard character, the fourth processing unit 703 is used for deciding whether the relevant information of the first SIP request and that of the second SIP request match with each other and outputting the decision to the third processing unit 702. The relevant information may be user related information including P-Asserted-Identity header and/or Request-URI header.

The third processing unit 702 is logically connected to both the second processing unit 701 and the fourth processing unit 703 respectively and is used for processing the second SIP request according to the decision of the second processing unit 701 or that of the fourth processing unit 703.

The fourth processing unit 703 is optional and may be excluded. In other words, the process of deciding whether relevant information of the first SIP request and that of the second SIP request match according to the wildcard matching rule can be excluded. In this case, the second processing unit 701 directly outputs the decision to the third processing unit 702.

Figure 8:
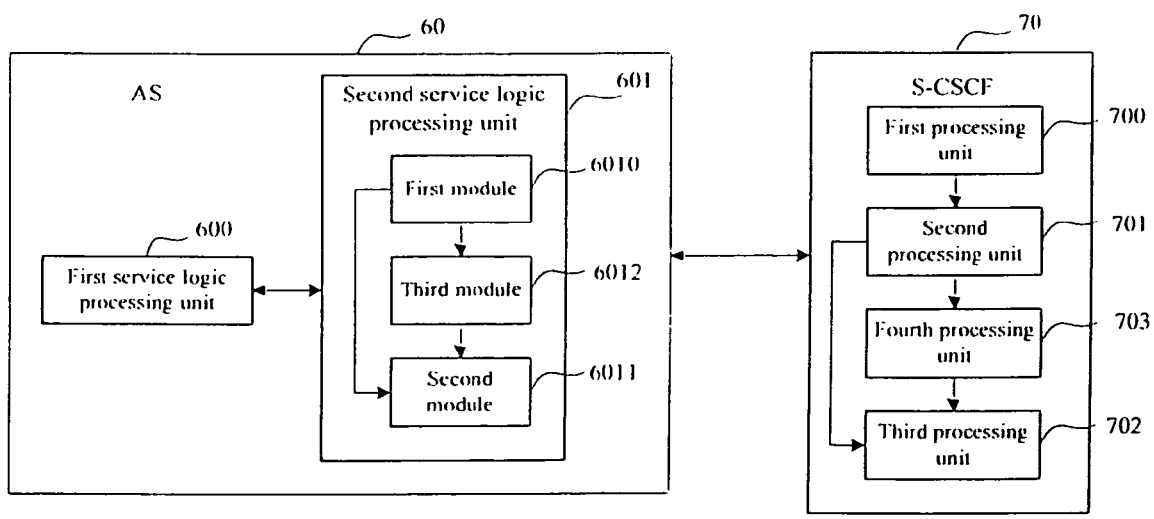
FIG. 8 is a schematic diagram of the structure of a system for processing SIP requests in IMS network in accordance with an embodiment of the present invention.

The present invention also provides a system for processing SIP requests in IMS network, which includes an AS and an S-CSCF entity. As shown in FIG. 8, the structure of the AS in FIG. 8 is completely the same as that of the AS shown in FIG. 6 and so are functions thereof, which are not to be described in detail; the structure of the S-CSCF in FIG. 8 is completely the same as that of the S-CSCF entity shown in FIG. 6 and so are functions thereof, which is not to be described in detail hereinafter.

The present invention will be further illustrated hereinafter with reference to an example, which only lists SIP request segments that are related to the present invention. Other details of each request can be obtained by referring to relevant standards.

1. The AS is on the calling side and determines that it is not needed to associate the original SIP request and the new SIP request in terms of the service logic at the S-CSCF.

In the first step, the S-CSCF receives an incoming SIP request (segment), which is as follows:

. . .
INVITE sip:bob@biloxi.com SIP/2.0
To: Bob <sip:bob@ebiloxi.com>
From: Alice <sip:alice@atlanta.com>; tag=1928301774
Call-ID: a84b4c76e66710
Route: s-cscf1@biloxi.com
P-Asserted-Identity: "John Doe" <sip: user1_public1@home1.net>
. . .

Upon receiving the SIP request, the S-CSCF executes relevant service logic and decides to forward the SIP request to the AS, taking the SIP request as the first SIP request.

In the second step, the AS receives the first SIP request (segment) from the S-CSCF entity, which is as follows:

. . .
INVITE sip:bob@biloxi.com SIP/2.0
To: Bob <sip:bob@biloxi.com>
From: Alice <sip: alice@atlanta.com>; tag=1928301774
Call-ID: a84b4c76e66710
Route: <AS@biloxi.com>, <ORIG_DILAG ID@biloxi.com>
P-Asserted-Identity: "John Doe" <sip: user1_public1@home1.net>
. . .

In the third step, the AS finds out according to the service logic that the P-Asserted-Identity should be modified, thus it is not needed to associate the first SIP request with the second SIP request at the S-CSCF, and the Route header of the second SIP request will be constructed and the Call ID may also be modified. The second SIP request (segment) generated by the AS is as follows:

. . .
INVITE sip:bob@biloxi.com SIP/2.0
To: Bob2 <sip:bob@biloxi.com>
From: Alice2 <sip:alice@atlanta.com>; tag=1928301774
Call-ID: a84b4c76e66721
Route: <S-CSCF@biloxi.com; Orig>
P-Asserted-Identity: "TOM" <sip: user2_public1@home1.net>
. . .

In the fourth step, upon receiving the second SIP request sent by the AS, the S-CSCF detects no Orig-DIALOG ID, so the second SIP request will be taken as a new calling dialog and will be processed based on a new iFC. The SIP request (segment) after being processed is as follows:

. . .
INVITE sip:bob@biloxi.com SIP/2.0
To: Bob2 <sip:bob@biloxi.com>
From: Alice2 <sip:alice@atlanta.com>; tag=1928301774
Call-ID: a84b4c76e66721
P-Asserted-Identity: "TOM" <sip: user2_public1@home1.net>
. . .

2. The AS is on the calling side and decides whether it is needed to associate the original SIP request and the new SIP request in terms of the service logic at the S-CSCF.

In the first step, the SIP request (segment) received by the S-CSCF is as follows:

. . .

```
INVITE sip:bob@biloxi.com SIP/2.0
To: Bob <sip:bob@biloxi.com>
From: Alice <sip:alice@atlanta.com>; tag=1928301774
Call-ID: a84b4c76e66710
Route: s-cscf1@biloxi.com
P-Asserted-Identity:    "John    Doe"    <sip:
    user1_public1@home1.net>
. . .
```

The S-CSCF executes relevant service logic and decides to forward the request to AS, taking the request as the first SIP request.

In the second step, the first SIP request (segment) received by the AS from the S-CSCF entity is as follows:

```
. . .
INVITE sip:bob@biloxi.com SIP/2.0
To: Bob <sip:bob@biloxi.com>
From: Alice <sip:alice@atlanta.com>; tag=1928301774
Call-ID: a84b4c76e66710
Route:    <AS@biloxi.com>,    <ORIG_DILAG
    ID@biloxi.com>
P-Asserted-Identity:    "John    Doe"    <sip:
    user1_public1@home1.net>
. . .
```

In the third step, the AS determines not to modify P-Asserted-Identity according to the service logic, thus it is needed to associate the first SIP request with the second SIP request at the S-CSCF, and the Route header of the first SIP request will be copied. The second SIP request generated by the AS is as follows:

```
. . .
INVITE sip:bob@biloxi.com SIP/2.0
To: Bob2 <sip:bob@biloxi.com>
From: Alice2 <sip:alice@atlanta.com>; tag=1928301774
Call-ID: a84b4c76e66721
Route: <ORIG_DILAG ID@biloxi.com>
P-Asserted-Identity:    "John    Doe"    <sip:
    user1_public1@home1.net>
. . .
```

In the fourth step, upon receiving the second SIP request, the S-CSCF detects an Orig-DIALOG ID, determines that the second SIP request is associated with the first SIP request and finds that the P-Asserted-Identity is unmodified, so the original incomplete iFC process will be continued. The SIP request (segment) after being processed is as follows:

```
. . .
INVITE sip:bob@biloxi.com SIP/2.0
To: Bob2 <sip:bob@biloxi.com>
From: Alice2 <sip:alice@atlanta.com>; tag=1928301774
Call-ID: a84b4c76e66721
P-Asserted-Identity:    "John    Doe"    <sip:
    user1_public1@home1.net>
. . .
```

The foregoing is only the preferred embodiments of the present invention and is not to limit the scope of the present invention. Any modification, equivalent ion, or improvement made without departing from the spirit and principle of the invention should be covered by the scope set forth in the appended claims.

What is claimed is:

1. A method for processing Session Initiation Protocol (SIP) requests in an IP Multimedia Subsystem (IMS) network, comprising:

an Application Server (AS) in the IMS network receiving a first SIP request forwarded by a Serving Call Session Control Function (S-CSCF) entity and generating a second SIP request according to the first SIP request;

the AS deciding whether it is needed to associate the second SIP request with the first SIP request in the S-CSCF entity according to an execution result of a selected service logic, if it is needed to associate the two SIP requests, removing an Uniform Resource Identifier (URI) of the AS from a Route header of the first SIP request and taking the rest of the Route header as a Route header of the second SIP request; otherwise, the AS constructing the Route header of the second SIP request in an originating User Agent (UA) behavior mode;

the AS sending the second SIP request to the S-CSCF entity; and wherein the AS deciding whether to associate the first SIP request with the second SIP request according to the execution result of the selected service logic further comprises: deciding whether to associate the first SIP request with the second SIP request by comparing user related information that is generated by the service logic for the second SIP request and user related information of the first SIP request.

2. The method according to claim 1, wherein deciding whether to associate the first SIP request with the second SIP request by comparing the user related information that is generated by the service logic for the second SIP request and the user related information of the first SIP request comprises:

deciding whether the user related information of the first SIP request is the same as that of the second SIP request, if yes, determining to associate the two SIP requests; otherwise, determining not to associate the two SIP requests.

3. The method according to claim 2, further comprising:

if the user related information of the first SIP request and that of the second SIP request are different, deciding whether the user related information includes a wildcard character, if not, determining not to associate the two SIP requests; and if the user related information includes a wildcard character, deciding whether the user related information of the first SIP request and that of the second SIP request match with each other according to a predefined wildcard matching rule, if yes, determining to associate the two SIP requests; otherwise, determining not to associate the two SIP requests.

4. The method according to claim 1, further comprising:

the AS specifying whether it is on the calling side or on the called side through subscription data of an initial Filter Criteria (iFC);

wherein, if the AS is on the calling side, the user related information comprises P-Asserted-Identity of the first SIP request and that of the second SIP request which are used for identifying a request originator;

if the AS is on the called side, the user related information comprises Request-URI and/or P-Asserted-Identity of the first SIP request and that of the second SIP request which are used for identifying a destination end.

5. The method according to claim 1, further comprising:

upon receiving the second SIP request, the S-CSCF entity deciding whether the second SIP request carries an associated dialog identifier, if the second SIP request does not carry the identifier, the S-CSCF entity processing the second SIP request in a manner of processing a new dialog;

if the second SIP request carries the identifier, the S-CSCF entity finding the first SIP request that is associated with the second SIP request according to the associated dialog identifier and deciding whether user related information of the first SIP request is the same as that of the second SIP request;

if the user related information of the two SIP requests are the same, the S-CSCF entity performing subsequent processing upon the second SIP request according to the fact that the first SIP request and the second SIP request are associated in terms of service logic; and if the user related information of the two SIP requests are different, the S-CSCF entity performing subsequent processing upon the second SIP request according to the fact that the first SIP request and the second SIP request, are unassociated in terms of the service logic.

6. The method according to claim 5, wherein the S-CSCF entity performing subsequent processing if the first SIP request and that of the second SIP request are associated in terms of the service logic comprises: the S-CSCF entity performing subsequent initial Filter Criteria (iFC) process upon the second SIP request.

7. The method according to claim 5, further comprising:
if the S-CSCF entity determines that the user related information of the first SIP request and that of the second SIP request are different, the S-CSCF entity deciding whether the user related information of the first SIP request or that of the second SIP request includes a wildcard character, if neither the user related information of the first SIP request nor that of the second SIP request includes a wildcard character, determining that the user related information of the first SIP request and that of the second SIP request do not match;

if the user related information of the first SIP request or that of the second SIP request includes a wildcard character, deciding whether the user related information of the first SIP request and that of the second SIP request match according to a wildcard matching rule, if yes, performing subsequent processing according to the fact that the first SIP request and the second SIP request are associated in terms of service logic; otherwise, performing subsequent processing according to the fact that the first SIP request and the second SIP request are unassociated in terms of service logic.

8. The method according to claim 5, wherein: if the S-CSCF entity is on the calling side, the user related information comprises P-Asserted-Identity of the first SIP request and that of the second SIP request; or if the S-CSCF entity is on the called side, the user related information comprises Request-URI and/or P-Asserted-Identity of the first SIP request and that of the second SIP request.

9. A method for processing Session Initiation Protocol (SIP) requests in an IP Multimedia Subsystem (IMS) network, comprising:
an Application Server (AS) in the IMS network receiving a first SIP request forwarded by a Serving Call Session Control Function (S-CSCF) entity and generating a second SIP request according to the first SIP request;

the AS deciding whether it is needed to associate the second SIP request with the first SIP request in the S-CSCF entity, if it is needed to associate the two SIP requests, removing an Uniform Resource Identifier (URI) of the AS from a Route header of the first SIP request and taking the rest of the Route header as a Route header of the second SIP request; if there is no need to associate the two SIP request, the AS constructing the Route header of the second SIP request in an originating UA behavior mode;

the AS sending the second SIP request to the S-CSCF entity;

upon receiving the second SIP request, the S-CSCF entity deciding whether the second SIP request carries an associated dialog identifier, if the second SIP request does not carry the identifier, the S-CSCF entity processing the second SIP request in a manner of processing a new dialog;

if the second SIP request carries the identifier, the S-CSCF entity finding the first SIP request that is associated with the second SIP request according to the associated dialog identifier and deciding whether user related information of the first SIP request is the same as that of the second SIP request if the user related information of the two SIP requests are the same, the S-CSCF entity performing subsequent processing upon the second SIP request according to the fact that the first SIP request and the second SIP request are associated in terms of service logic; and if the user related information of the two SIP requests are different, the S-CSCF entity performing subsequent processing upon the second SIP request according to the fact that the first SIP request and the second SIP request are unassociated in terms of the service logic.

10. The method according to claim 9, further comprising:
if the user related information of the first SIP request and that of the second SIP request are different, deciding whether the user related information of the first SIP request or that of the second SIP request comprises a wildcard character;

if neither the user related information of the first SIP request nor that of the second SIP request comprises a wildcard character, performing subsequent processing upon the second SIP request according to the fact that the first SIP request and the second SIP request are unassociated in terms of the service logic;

if the user related information of the first SIP request or that of the second SIP request comprises a wildcard character, deciding whether the user related information of the first SIP request and that of the second SIP request match according to a wildcard matching rule; and if the user related information of the two SIP requests match, performing subsequent processing upon the second SIP request according to the fact that the first SIP request and the second SIP request are associated in terms of the service logic; otherwise, performing subsequent processing upon the second SIP request according to the fact that the first SIP request and the second SIP request are unassociated in terms of the service logic.

11. The method according to claim 9, wherein the S-CSCF entity performing subsequent processing if the first SIP request and that of the second SIP request are associated in terms of the service logic comprises: the S-CSCF entity performing subsequent initial Filter Criteria (iFC) processing upon the second SIP request.

12. The method according to claim 9, wherein: if the AS is on the calling side, the user related information comprises P-Asserted-Identity of the first SIP request and that of the second SIP request which are used for identifying a request originator; and if the AS is on the called side, the user related information comprises Request-URI and/or P-Asserted-Identity of the first SIP request and that of the second SIP request which are used for identifying a destination end.

* * * * *

UNITED STATES PATENT AND TRADEMARK OFFICE
CERTIFICATE OF CORRECTION

| | |
|---|---|
| PATENT NO. | : 7,835,352 B2 |
| APPLICATION NO. | : 11/506581 |
| DATED | : November 16, 2010 |
| INVENTOR(S) | : Fenqin Zhu and Yajuan Wu |

It is certified that error appears in the above-identified patent and that said Letters Patent is hereby corrected as shown below:

Column 6, line 13, delete "fist" and insert -- first --.

Column 6, line 15, delete "fist" and insert -- first --.

Column 8, line 25, delete "request" and insert -- requests --.

Signed and Sealed this

Thirty-first Day of May, 2011

David J. Kappos
*Director of the United States Patent and Trademark Office*